US009521033B2

(12) United States Patent
Madem et al.

(10) Patent No.: US 9,521,033 B2
(45) Date of Patent: Dec. 13, 2016

(54) IPOE DUAL-STACK SUBSCRIBER FOR BRIDGED RESIDENTIAL GATEWAY CONFIGURATION

(71) Applicant: Telefonaktiebolaget L M Ericsson (publ), Stockholm (SE)

(72) Inventors: Satyanarayana Madem, San Jose, CA (US); Weifang Yang, Palo Alto, CA (US); Sunny Y. Wang, Palo Alto, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 200 days.

(21) Appl. No.: 14/244,727

(22) Filed: Apr. 3, 2014

(65) Prior Publication Data

US 2015/0244560 A1 Aug. 27, 2015

Related U.S. Application Data

(60) Provisional application No. 61/943,447, filed on Feb. 23, 2014.

(51) Int. Cl.
*H04L 12/24* (2006.01)
*H04L 29/08* (2006.01)
*H04L 29/06* (2006.01)

(52) U.S. Cl.
CPC .............. *H04L 41/02* (2013.01); *H04L 67/14* (2013.01); *H04L 69/14* (2013.01); *H04L 69/18* (2013.01); *H04L 69/321* (2013.01)

(58) Field of Classification Search
None
See application file for complete search history.

(56) References Cited

U.S. PATENT DOCUMENTS

| 5,610,910 A | 3/1997 | Focsaneanu et al. |
| 6,073,178 A | 6/2000 | Wong et al. |

(Continued)

FOREIGN PATENT DOCUMENTS

| EP | 2615788 | 7/2013 |
| EP | 2854343 A1 | 4/2015 |

(Continued)

OTHER PUBLICATIONS

Extended European Search Report, EP Application No. 14173768.4, dated Feb. 27, 2015, 4 pages.

(Continued)

*Primary Examiner* — Kevin Bates
*Assistant Examiner* — Lesa Kennedy
(74) *Attorney, Agent, or Firm* — Nicholson De Vos Webster & Elliott, LLP

(57) ABSTRACT

A network element implements a method to support a plurality of network services between a computing device and the network element over non-channelized media using a single subscriber session. The method includes receiving from a computing device a request for a first network service that includes a Media Access Control (MAC) address of the computing device, retrieving a user record from a database server based on the MAC address of the computing device, determining from the user record whether the computing device supports the first network service and a second network service, and upon determining that the computing device supports the first network service and the second network service, creating a single dual-stack session that combines the first network service and the second network service. The method further includes enabling the computing device to access the first network service and the second network service where the first network service and the (Continued)

second network service are managed by the single dual-stack session.

16 Claims, 10 Drawing Sheets

(56) References Cited

U.S. PATENT DOCUMENTS

| | | | |
|---|---|---|---|
| 6,078,568 | A | 6/2000 | Wright et al. |
| 6,098,116 | A | 8/2000 | Nixon et al. |
| 6,112,246 | A | 8/2000 | Horbal et al. |
| 6,317,830 | B1 | 11/2001 | Stolz |
| 6,339,830 | B1 | 1/2002 | See et al. |
| 6,359,890 | B1 | 3/2002 | Shoho et al. |
| 6,370,122 | B1 | 4/2002 | Nussbaumer et al. |
| 6,473,411 | B1 | 10/2002 | Kumaki et al. |
| 6,603,758 | B1 | 8/2003 | Schmuelling et al. |
| 6,609,153 | B1 | 8/2003 | Salkewicz |
| 6,618,858 | B1 | 9/2003 | Gautier |
| 6,912,567 | B1 | 6/2005 | Allard et al. |
| 7,535,926 | B1 * | 5/2009 | Deshpande ......... H04L 12/2856 370/392 |
| 7,895,304 | B1 | 2/2011 | Kilfoyle et al. |
| 8,130,712 | B1 * | 3/2012 | Bennett, III ............ H04W 4/24 370/329 |
| 8,151,325 | B1 * | 4/2012 | Bennett, III ...... H04L 29/12971 713/168 |
| 8,321,550 | B2 | 11/2012 | Kilfoyle et al. |
| 8,681,695 | B1 | 3/2014 | Krishnan |
| 2001/0019559 | A1 | 9/2001 | Handler et al. |
| 2002/0114274 | A1 | 8/2002 | Sturges et al. |
| 2003/0005100 | A1 | 1/2003 | Barnard et al. |
| 2003/0145075 | A1 | 7/2003 | Weaver et al. |
| 2004/0031030 | A1 | 2/2004 | Kidder et al. |
| 2004/0131078 | A1 | 7/2004 | Gupta et al. |
| 2004/0218580 | A1 | 11/2004 | Bahl et al. |
| 2005/0198277 | A1 * | 9/2005 | Wada .................. H04L 63/0892 709/224 |
| 2006/0098669 | A1 | 5/2006 | Enns et al. |
| 2008/0201765 | A1 | 8/2008 | Walter et al. |
| 2011/0106947 | A1 * | 5/2011 | Lin .................. H04L 29/12216 709/225 |
| 2011/0145379 | A1 | 6/2011 | Kilfoyle et al. |
| 2011/0188379 | A1 | 8/2011 | Calippe |
| 2013/0086634 | A1 * | 4/2013 | Dee ..................... H04L 63/0876 726/3 |
| 2014/0146818 | A1 * | 5/2014 | Shekhar ............. H04L 61/2571 370/392 |

FOREIGN PATENT DOCUMENTS

| | | |
|---|---|---|
| JP | 10210066 | 8/1998 |
| JP | 11-355303 | 12/1999 |
| JP | 2000-209268 | 7/2000 |
| JP | 2001-156846 | 6/2001 |
| JP | 2001-339437 | 12/2001 |
| JP | 2001-350937 | 12/2001 |
| WO | WO-9927693 | 6/1999 |
| WO | WO-01/19080 A2 | 3/2001 |
| WO | WO-03/091963 A2 | 11/2003 |
| WO | WO-03/091963 A3 | 11/2003 |

OTHER PUBLICATIONS

Certificate of Grant of Standard Patent for Hong Kong Patent Application No. 05106021.5, mailed Jan. 16, 2015, 3 pages.
Non-Final Office Action for U.S. Appl. No. 14/244,723, mailed Oct. 8, 2015, 20 pages.
"IEEE Standard for Local and Metropolitan Area Networks: Overview and Architecture", IEEE Std 802-2001, IEEE Computer Society, Mar. 8, 2002, 46 pages.
Marc Bernstein, "Understanding PPPoE and DHCP", White Paper by Juniper Networks, May 2006, pp. 1-15.
RFC 2865: Rigney et al., "Remote Authentication Dial in User Service (RADIUS)", Network Working Group, Request for Comments: 2865, pp. 1-76.
Final Office Action from U.S. Appl. No. 13/032,624, mailed Oct. 24, 2014, 27 pages.
Ethers(5) Man page. FreeBSD File Formats Manual, FreeBSD 9.2. Apr. 12, 1995. <http://www.freebsd.org/cgi/man.cgi?query=ethers&apropos=0&sektion=5&manpath=FreeBSD+10.0-RELEASE&arch=default&format=ascii>. 1 page.
Non-Final Office Action, U.S. Appl. No. 13/032,624, dated May 29, 2014, 33 pages.
Decision to Grant, EP Application No. 03726459.5, dated Jul. 10, 2014, 2 pages.
Notice of the Reason for Refusal, U.S. Appl. No. 2010-067983, dated May 6, 2011, 4 pages.
Communication pursuant to Article 94(3) EPC, European Application No.03726459.5, dated Jun. 14, 2011, 6 pages.
US Office Action for related U.S. Appl. No. 10/133,072, Jun. 20, 2008, 14 pgs.
US Office Action for related U.S. Appl. No. 10/133,072, Dec. 16, 2008, 16 pgs.
US Notice of Allowance for related U.S. Appl. No. 10/133,072, Oct. 15, 2010, 10 pgs.
US Office Action for related U.S. Appl. No. 10/133,072, Mar. 22, 2007, 18 pgs.
US Final Office Action for related U.S. Appl. No. 10/133,072, Oct. 5, 2007, 28 pgs.
US Final Office Action for related U.S. Appl. No. 10/133,072, Mar. 1, 2010, 16 pgs.
US Office Action for related U.S. Appl. No. 10/133,072, Jul. 7, 2009, 17 pgs.
Foreign Office Action from Counterpart Japanese Patent Application No. 2004-500262 and English Translation, mailed Jul. 29, 2008 (9 pages).
Foreign Office Action from Counterpart Japanese Patent Application No. 2004-500262 and English Translation, mailed Apr. 21, 2009 (5 pages).
Foreign Office Action from Counterpart Japanese Patent Application No. 2004-500262 and English Translation, mailed Nov. 24, 2009 (6 pages).
Non-Final Office Action, U.S. Appl. No. 12/580,215, Jan. 4, 2012, 13 pages.
Communication pursuant to Article 94(3) EPC, European Application No. 03726459.5, dated Feb. 23, 2012, 5 pages.
Non-Final Office Action, U.S. Appl. No. 12/580,215, dated Apr. 16, 2012, 11 pages.
Notice of Allowance, U.S. Appl. No. 12/580,215, dated Jul. 27, 2012, 16 pages.
Notice of Allowance, Application No. 2010-067983, dated Oct. 9, 2012, 2 pages.
*Address Resolution Protocol*, Retrieved from the internet on Mar. 8, 2007, Wikipedia, http://en.wikipedia.org/wiki/Address_Resolution_Protocol.
*ARP—Q&A*, (http://www.geocities.com/SiliconValley/Vista/8672/network/arp.html?20078,(Feb. 17, 1999).
*MAC address*, Retrieved from the internet on Mar. 8, 2007, Wikipedia, http://en.wikipedia.org/wiki/MAC_address.
*OSI model*, Retrieved from the internet on Mar. 8, 2007, Wikipedia, http://en.wikipedia.org/wiki/Seven-layer_OSI_model.
Foreign counterpart Supplementary Search Report European Application No. 03726459.5 mailed Apr. 29, 2013, 3 pages.
"*Welcome to the DHCP Reading Room!*," retrieved from the Internet on Mar. 8, 2007, http://www.ehsco.com/reading/dhcp.html, 1-2.
RedBack Networks "*Technology Brief, Clientless IP Service Selection,*" Copyright © 2003, pp. 1-5.
RedBack Networks, "*Deploying WiFi Services with Redback Products,*" A White Paper from Redback Networks, 25 pages.
International Search Report, Application No. PCT/US03/12862, dated Oct. 17, 2003, 5 pgs.
International Preliminary Examination Report, Application No. PCT/US03/12862, dated Sep. 15, 2005.

(56) References Cited

OTHER PUBLICATIONS

Comer, D.E. , "Internetworking with TCP/IP vol. 1: Principles, Protocols and Architecture", *Fourth Edition*, Chapter 2, pp. 17-52, Prentice Hall, 2000.

Droms R , "Dynamic Host Configuration Protocol," *Network Working Group RFC: 1541*, (Oct. 1993), 1-39.

Hall, Eric A., *How DHCP Works*, http://www.ehsco.com/reading/19960515ncw3.html, (May 15, 1996).

Wobus, John , *DHCP FAQ*, http://ns.uoregon.edu/dhcp/faq.html, (Jun. 20, 1996).

EP Application No. 14173768.4, Intention to Grant, dated May 4, 2015, 6 pages.

JP Application No. 2004-500262, Notice of Allowance, dated Jul. 16, 2010, 2 pages.

PCT Application No. PCT/IB2015/050968, PCT Notification of Transmittal of the International Search Report and the Written Opinion of the International Searching Authority, mailed May 4, 2015, 9 pages.

PCT Application No. PCT/IB2015/051287, PCT Notification of Transmittal of the International Search Report and the Written Opinion of the International Searching Authority, mailed May 4, 2015, 10 pages.

U.S. Appl. No. 13/032,624, Non-Final Office Action, mailed May 20, 2015, 33 pages.

RFC 2131: DROMS, "Dynamic Host Configuration Protocol," Internet Engineering Taskforce, Network Working Group, Request for Comments, Mar. 1997, 45 pages.

RFC 3315: DROMS, et al., "Dynamic Host Configuration Protocol for IPv6 (DHCPv6)," The Internet Society, Network Working Group, Request for Comments, Jul. 2003, 101 pages.

RFC 3633: Troan, et al., "IPv6 Prefix Options for Dynamic Host Configuration Protocol (DHCP) version 6," The Internet Society, Network Working Group, Request for Comments, Dec. 2003, 101 pages.

RFC 4862: Thomson, et al., "IPv6 Stateless Address Autoconfiguration," Internet Engineering Taskforce, Network Working Group, Request for Comments, Sep. 2007, 30 pages.

Hexadecimal and Binary Numbering and IP Addressing. Cisco Press. Mar. 3, 1999. <http://www.cisco.com/cpress/cc/td/cpress/fund/primer/cb0708.htm>. pp. 1-11.

Notice of Allowance for U.S. Appl. No. 13/032,624, Dec. 30, 2015, 17 pages.

Final Office Action for U.S. Appl. No. 14/244,723, Dec. 30, 2015, 20 pages.

\* cited by examiner

IPOE DUAL-STACK SUBSCRIBER FOR BRIDGED RESIDENTIAL GATEWAY CONFIGURATION

CROSS-REFERENCE TO RELATED APPLICATIONS

The present application claims the benefit of priority from U.S. Provisional Application No. 61/943,447 entitled "IPoE Dual-Stack Subscriber" filed Feb. 23, 2014. Cross-reference is made to U.S. application Ser. No. 14/244,723 filed Feb. 23, 2014. The cross-referenced application is incorporated herein by reference.

FIELD

The invention relates to the field of communications. More specifically, the invention relates to supporting a plurality of network services for a subscriber over non-channelized media using a single subscriber session for a bridged residential gateway configuration.

BACKGROUND

In the field of communications, the need for high-speed transmission of data including video and audio has continued to increase. Moreover, there has been an increase in the selection of services by which users can connect to a network, such as the Internet. Specifically, Internet Service Providers (ISPs) may allow for connectivity to the Internet through lower-speed connections at different rates, such as 56 kilobits/second, by employing a Plain Old Telephone Service (POTS) line. Other choices for connection, which are at higher speeds, into a network can include Integrated Services Digital Network (ISDN), Digital Subscriber Line (DSL) service (both using a POTS line), and cable modem service over a Radio Frequency (RF) cable line.

Typical approaches to network connectivity for certain connection services (including cable modem service) are such that a group of subscribers are pooled together and treated as a single entity (non-channelized media). Such an approach does not allow for individualized accounting and/or usage tracking for different subscribers connecting to the network. In contrast, other techniques (including Digital Subscriber Line (DSL) service) do allow for individualized treatment of subscribers (channelized media). Disadvantageously, these techniques require specialized software and/or hardware to be executing on the individual subscriber/client machines to allow for this individualized approach. In particular, DSL service provides for this individualized treatment by using software and/or hardware that allows for the Point-to-Point Protocol over Ethernet (PPPoE) protocol. Accordingly, the costs of such services are increased to account for this additional software and/or hardware.

Clientless Internet Protocol Services (CLIPS) allows for individualized treatment of subscribers over non-channelized media. As a result, various accounting and/or usage tracking such as rate limiting, policing values, access control lists, quality of service (QoS), and accounting can be performed on a per subscriber basis. Moreover, such treatment is independent of the need to install specific hardware and/or software on the client device.

CLIPSv4 is based on Dynamic Host Configuration Protocol (DHCP) and services IPv4 traffic. CLIPSv6 is based on DHCPv6 and services IPv6 traffic. Many end user devices are both IPv4 and IPv6 capable and thus can establish both a CLIPSv4 session and a CLIPSv6 session. However, the CLIPSv4 session and CLIPSv6 session exist as separate sessions even though they are servicing the same subscriber.

SUMMARY

A method is described to be implemented by a network element to support a plurality of network services between a computing device and the network element over non-channelized media using a single subscriber session. The method includes receiving from a computing device a request for a first network service that includes a Media Access Control (MAC) address of the computing device, retrieving a user record from a database server based on the MAC address of the computing device, determining from the user record whether the computing device supports the first network service and a second network service, and upon determining that the computing device supports the first network service and the second network service, creating a single dual-stack session that combines the first network service and the second network service. The method further includes enabling the computing device to access the first network service and the second network service. The first network service and the second network service are managed by the single dual-stack session.

A network element is described to support a plurality of network services between a computing device and the network element over non-channelized media using a single subscriber session. The network element comprises a network interface to communicate with the residential gateway and a processor communicatively coupled to the network interface. The processor is configured to execute a host configuration component, an Authentication, Authorization, and Accounting (AAA) component, and a subscriber session manager component. The host configuration component is configured to receive from the computing device a request for a first network service, where the request includes a Media Access Control (MAC) address of the computing device. The AAA component is configured to retrieve a user record from a database server based on the MAC address of the computing device and to determine from the user record whether the computing device supports both the first network service and a second network service. The subscriber session manager component is configured to create a single dual-stack session that combines the first network service and the second network service upon determining that the computing device supports both the first network service and the second network service. The host configuration component is further configured to enable the computing device to access the first network service and the second network service, where the first network service and the second network service are managed by the single dual-stack session.

BRIEF DESCRIPTION OF THE DRAWINGS

Embodiments of the invention may be best understood by referring to the following description and accompanying drawings which illustrate such embodiments. The numbering scheme for the Figures included herein are such that the leading number for a given element in a Figure is associated with the number of the Figure. However, element numbers are the same for those elements that are the same across different Figures. In the drawings.

DETAILED DESCRIPTION

Figure 1:
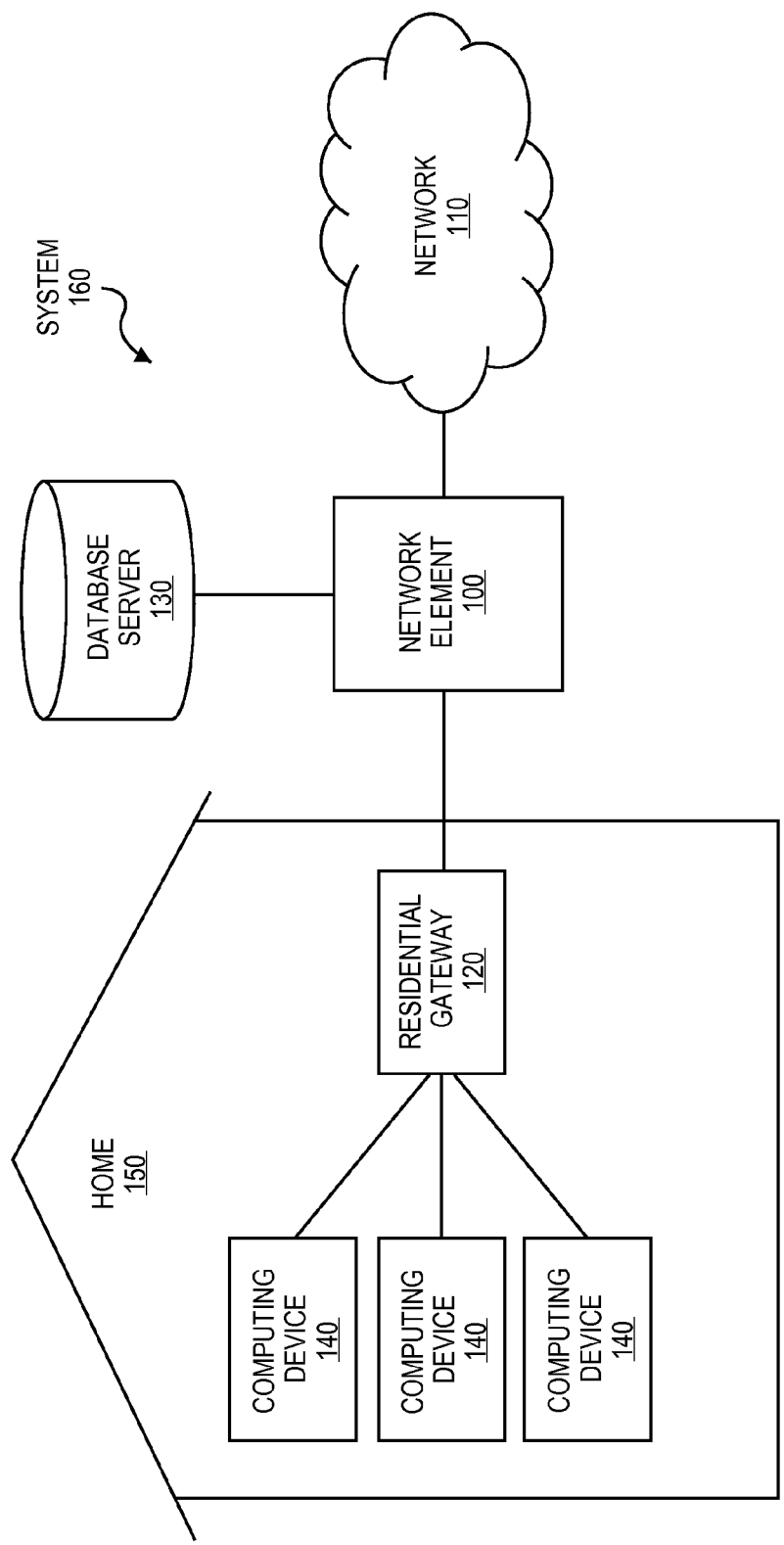
FIG. 1 is a diagram of one embodiment a system for enabling a plurality of network services for a subscriber over non-channelized media using a single subscriber session.

A method and apparatus for providing a plurality of network services for a subscriber over non-channelized media using a single dual-stack session are described. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

As used herein, the singular forms "a," "an," and "the" are intended to include the plural forms as well, unless the context clearly indicates otherwise. Well-known functions or constructions may not be described in detail for brevity and/or clarity. The term "and/or" includes any and all combinations of one or more of the associated listed items.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

As used herein, the terms "comprise," "comprising," "comprises," "include," "including," "includes," "have," "has," "having," or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.," which derives from the Latin phrase "exempli gratia," may be used to introduce or specify a general example or examples of a previously mentioned item, and is not intended to be limiting of such item. The common abbreviation "i.e.," which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-Ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, microcode, etc.) that runs on a processor such as a digital signal processor, which may collectively be referred to as "circuitry," "a module," "a component," or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

Embodiments of the invention enable a plurality of network services for a subscriber to be delivered over non-channelized media using a single subscriber session. In an embodiment, a subscriber session is consolidated with an existing subscriber session into a single dual-stack session. As will be described in more detail below, the decision to consolidate subscriber sessions can be based on having a matching subscriber Media Access Control (MAC) address. In another embodiment, a dual-stack session that combines a first network service and a second network service is provisioned based on a determination that the subscriber supports both the first network service and the second network service. As will be described in more detail below, the determination of whether the subscriber supports both the first network service and the second network service can be made based on a user record retrieved from a database server. Accordingly, network traffic for different network services for a subscriber can be managed, tracked, and reported separately and aggregately. Also, the consolidated subscriber session requires less operational maintenance and consumes less network resources.

FIG. 1 is a diagram of one embodiment a system 160 for enabling a plurality of network services for a subscriber over non-channelized media using a single subscriber session. FIG. 1 shows a system 160 including a computing device 140, a residential gateway 120, a network element 100, a database server 130, and a network 110. As shown, the computing device 140 and the residential gateway 120 are located in a home 150. The computing device 140 is coupled to the network element 100 through the residential gateway 120. The computing device 140 can be any type of device that is capable of connecting to the residential gateway 120 including desktops, laptops, mobile devices, tablets, servers, and similar devices. The computing device 140 can connect to the residential gateway 120 using a wired connection, a wireless connection, or a combination of wireless and wireless connections. For example, in one embodiment, the computing device 140 can connect to the residential gateway 120 via an Ethernet cable. In another embodiment, the computing device 140 can connect to the residential gateway 120 via WiFi. Other types of wired and wireless connections are contemplated as well. The network element 100 is also coupled to the database server 130 and the network 110. In one embodiment, the network element 100 is coupled to the database server 130 through the network 110. In another embodiment, the network element 100 is coupled to the database server 130 through a network that is separate from the network 110.

In one embodiment, the network 110 is a local area network (LAN). In another embodiment, the network 110 is a wide area network (WAN). Further, the network 110 may be a combination of different networks that couple the network element 100 to other computing devices 140 and network elements 100 coupled thereto. In one embodiment, the network element 100 is coupled to receive data from computing device 140 and/or residential gateway 120 over non-channelized media.

The network element 100 enables computing device 140 and/or residential gateway 120 to connect to the network 110. In one embodiment, the network element 100 aggregates traffic from various subscriber sessions and routes it to the network 110 of an Internet Service Provider (ISP). In some embodiments, as will be described in more detail below, network element 100 includes a processor 205 working in conjunction with memory that can perform address assignment, provide AAA (authentication, authorization, and accounting) services, create and delete subscriber sessions, and enable subscribers to access network services.

The database server 130 stores data for a number of subscribers and their associated subscriber connections. In one embodiment, the database server 130 stores data related to authentication, authorization and accounting for subscribers coupled to different network elements 100 within a network 110. While FIG. 1 illustrates the network element 100 and database server 130 as two separate elements, embodiments of the invention are not so limited. For example, in another embodiment, the database server 130 and/or the records therein can be incorporated into the network element 100. In one embodiment, the database server 130 is a Remote Authentication Dial In User Service (RADIUS) server for storing data regarding subscribers and the associated subscriber connections. In some embodiments, the network element 100 can connect to multiple database servers 130 to provide redundancy in case of a server or network failure. In some embodiments, the database server 130 and the network element 100 are managed and operated by an Internet Service Provider (ISP).

In one embodiment, the residential gateway 120 is a home router. The home router 120, in certain embodiments, is capable of routing Internet Protocol version 4 (IPv4) traffic.

In such an embodiment, the home router 120 can obtain an IPv4 address using Dynamic Host Configuration Protocol (DHCP). In one embodiment, the home router 120 acts as a DHCP server to the computing devices 140 at home 150. When the home router 120 acts as a DHCP server, the home router 120 assigns private IPv4 address to the computing devices 140 and performs network address translation (NAT) for the computing devices 140. In certain embodiments, the home router 120 can also route Internet Protocol version 6 (IPv6) traffic. In such an embodiment, the home router 120 can obtain an IPv6 address using DHCPv6. In another embodiment, the home router 120 can obtain an IPv6 address using Neighbor Discovery Protocol (NDP). In one embodiment, the home router 120 delegates IPv6 addresses to the computing devices 140. In such an embodiment, the home router 120 can obtain an IPv6 prefix using DHCPv6 prefix delegation (PD) and delegate IPv6 addresses from this prefix to the computing devices 140. In one embodiment, the home router 120 can delegate IPv6 addresses to the computing devices 140 by performing stateless address auto configuration (SLAAC). The home router 120 can be a Clientless Internet Protocol Services (CLIPS) subscriber and establish a CLIPS session at the network element 100 to access network services on behalf of the computing devices 140.

In one embodiment, the residential gateway 120 is a bridged gateway. The bridged gateway 120, in certain embodiments, is a L2 device that couples the computing devices 140 at the home 150 to the network element 100. In a bridged gateway configuration, each computing device 140 can be considered as being directly coupled to the network element 100. In one embodiment, a computing device 140 behind a bridged gateway 120 can obtain an IPv4 address using DHCP. In one embodiment, a computing device 140 behind the bridged gateway 120 can obtain an IPv6 address using DHCPv6 or NDP. Each computing device 140 behind the bridged gateway 120 can be a CLIPS subscriber and establish its own CLIPS session at the network element 100 to access network services.

Routed Residential Gateway Configuration

Figure 3:
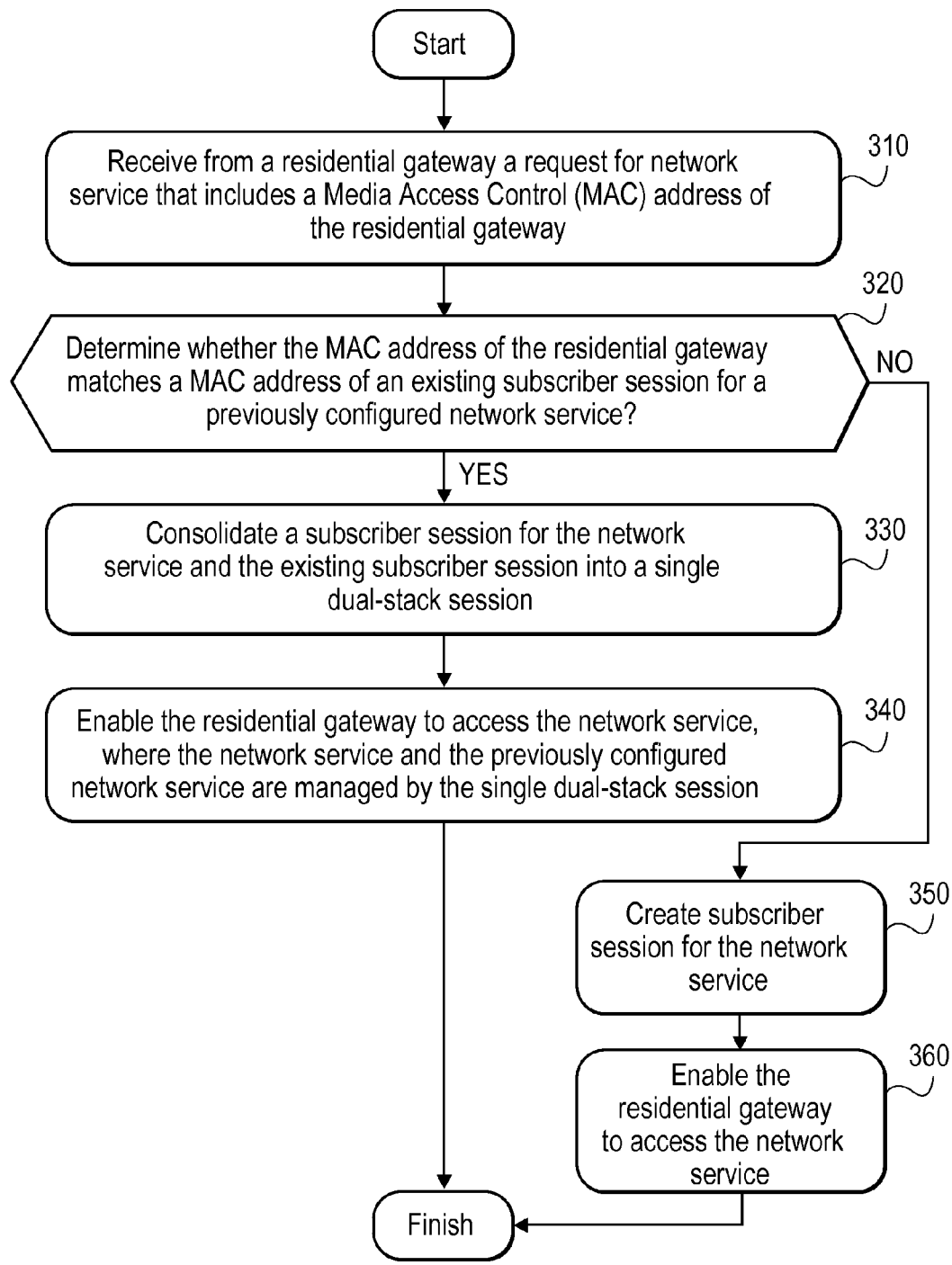
FIG. 3 is a flow diagram of one embodiment of a set of operations for enabling a plurality of network services for a subscriber over non-channelized media using a single dual-stack session for a routed residential gateway configuration.

FIG. 3 is a flow diagram of one embodiment of a set of operations for enabling a plurality of network services for a subscriber over non-channelized media using a single dual-stack session for a routed residential gateway 120 configuration. The operations of the flow diagram will be described with references to the system 160 shown in FIG. 1. The operations of the flow diagram may be performed by various components of the network element 100, which may be implemented as processing logic in software, hardware, or a combination thereof. However, it should be understood that the operations of the flow diagram could be performed by embodiments of systems and network elements other than those discussed with reference to the block diagrams, and embodiments discussed with reference to the system 160 and network element 100 could perform operations different than those discussed with reference to the flow diagram.

In block 310, a request for a network service from the residential gateway 120 is received. In one embodiment, the request is based on DHCP, which allows for the assignment of Internet Protocol (IP) addresses to clients being coupled to a network, as is known in the art. In one such embodiment, the request from the residential gateway 120 is a DHCP discover packet, which is requesting an IPv4 address from the network element 100. The DHCP discover packet, in certain embodiments, includes a Media Access Control (MAC) address of a customer premise equipment (such as the network card) within the residential gateway 120 that is communicating with the network element 100. In one embodiment, the request is based on DHCPv6, which allows for the assignment of IPv6 addresses to clients being coupled to a network, as is known in the art. In one such embodiment, the request from the residential gateway 120 is a DHCP solicit packet, which is requesting an IPv6 address from the network element 100. The packet header of the DHCP solicit packet, in certain embodiments, includes a MAC address of a customer premise equipment (such as the network card) within the residential gateway 120 that is communicating with the network element 100. Returning to FIG. 1 to help illustrate, the request for network service message is transmitted by the residential gateway 120, which can be considered as a subscriber of the network service.

In decision block 320, the network element 100 determines whether the MAC address of the residential gateway 120 matches a MAC address of an existing subscriber session for a previously configured network service. Existing subscriber sessions, in certain embodiments, are stored in a table data structure in the network element 100. However, embodiments of the invention are not so limited. In other embodiments, the subscriber sessions can be stored in other types of data structures or outside of the network element 100. In one embodiment, the existing subscriber sessions are CLIPS sessions.

If the MAC address of the residential gateway 120 does not match a MAC address of an existing subscriber session, at block 350, the network element 100 creates a subscriber session for the network service according to legacy operation. Then, at block 360, the network element enables the residential gateway 120 to access the network service.

If the MAC address of the residential gateway 120 matches the MAC address of an existing subscriber session, at block 330, the network element 100 consolidates the subscriber session for the network service and the existing subscriber session into a single dual-stack session. If the MAC address of the residential gateway 120 matches the MAC address of an existing subscriber session, this indicates that the residential gateway 120 has an existing session for a previously configured network service. As such, instead of creating a separate session for the requested network service, the session for the requested network service can be consolidated with the existing subscriber session into a single dual-stack session. In one embodiment, the existing subscriber session is a CLIPSv4 session for IPv4 network services and the requested network service is for IPv6 network services. In such an embodiment, instead of creating a separate CLIPS IPv6 session for the IPv6 network service, the network element 100 can consolidate the CLIPS IPv6 session with the existing CLIPS IPv4 session into a single dual-stack session. In other embodiments, the existing subscriber session is a CLIPS IPv6 session and the requested network service is for IPv4 network services. In a similar fashion, the CLIPS IPv4 session can be consolidated with the existing CLIPS IPv6 session into a single dual-stack session. Further, one having ordinary skill in the art will understand that other types of subscriber sessions and any number of subscriber sessions can be consolidated into a single session based on having a matching MAC address.

In block 340, the network element 100 enables the residential gateway 120 to access the requested network service where the requested network service and the previously configured network service are managed by the single dual-stack session. In an embodiment where the request for network service is based on DHCP, the network element 100 enables the residential gateway 120 to access the requested network service by transmitting a DHCP offer message to the residential gateway 120. The DHCP offer message provides the residential gateway 120 with an IPv4 address it can use to access the IPv4 network service. In an embodiment where the request for network service is based on DHCPv6, the network element 100 can enable the residential gateway 120 to access the requested network service by transmitting an IPv6 prefix assigned to the residential gateway 120 via NDP. Further, the network element 100 may transmit an IPv6 prefix delegation (PD) prefix to the residential gateway 120 via DHCPv6 so that the residential gateway 120 can delegate IPv6 addresses to computing devices 140 behind the residential gateway 120. As a result, the residential gateway 120 can now access a plurality of network services (e.g., IPv4 and IPv6 network services) and all network services are managed by a single dual-stack session.

Figure 4:
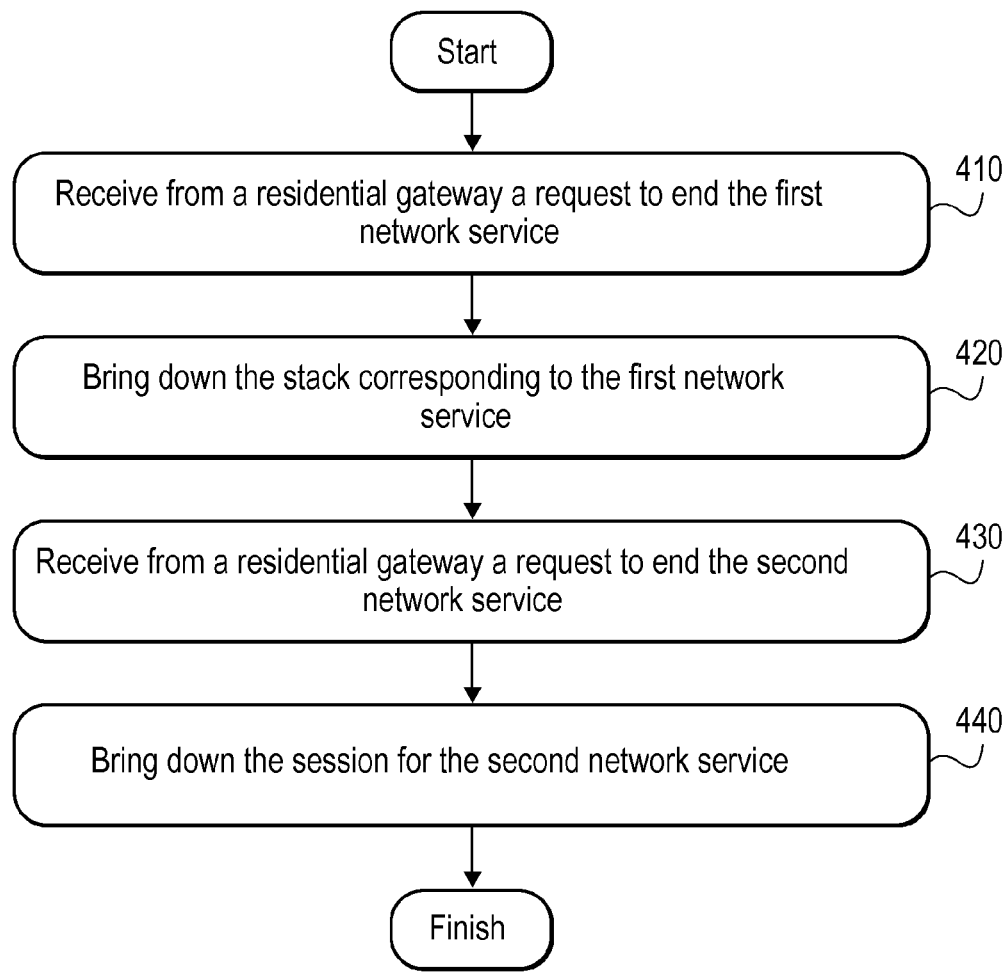
FIG. 4 is a flow diagram of one embodiment of a set of operations for bringing down a dual-stack session for a routed residential gateway configuration.

FIG. 4 is a flow diagram of one embodiment of a set of operations for bringing down a dual-stack session for a routed residential gateway 120 configuration. The operations of the flow diagram will be described with references to the system 160 shown in FIG. 1. The operations of the flow diagram may be performed by various components of the network element 100, which may be implemented as processing logic in software, hardware, or a combination thereof. However, it should be understood that the operations of the flow diagram could be performed by embodiments of systems and network elements other than those discussed with reference to the block diagrams, and embodiments discussed with reference to the system 160 and network element 100 could perform operations different than those discussed with reference to the flow diagram.

In block 410, a request to end a first network service from the residential gateway 120 is received. In one embodiment, the request is a DHCP release packet. In another embodiment, the request is a DHCPv6 release packet. In block 420, the network element 100 brings down the stack corresponding to the first network service. After the stack corresponding to the first network service is brought down, the subscriber can no longer access the first network service. However, the stack corresponding to the second network is still operable. As such, the subscriber can still access the second network service.

In block 430, a request to end a second network service from the residential gateway 120 is received. In one embodiment, the request is a DHCP release packet. In another embodiment, the request is a DHCPv6 release packet. In block 440, the network element 100 brings down the session for the second network service. In one embodiment, bringing down the session involves deleting a CLIPS session. After the session for the second network service is brought down, the subscriber can no longer access the first network service or the second network service and the session down operation is complete.

Figure 2A:
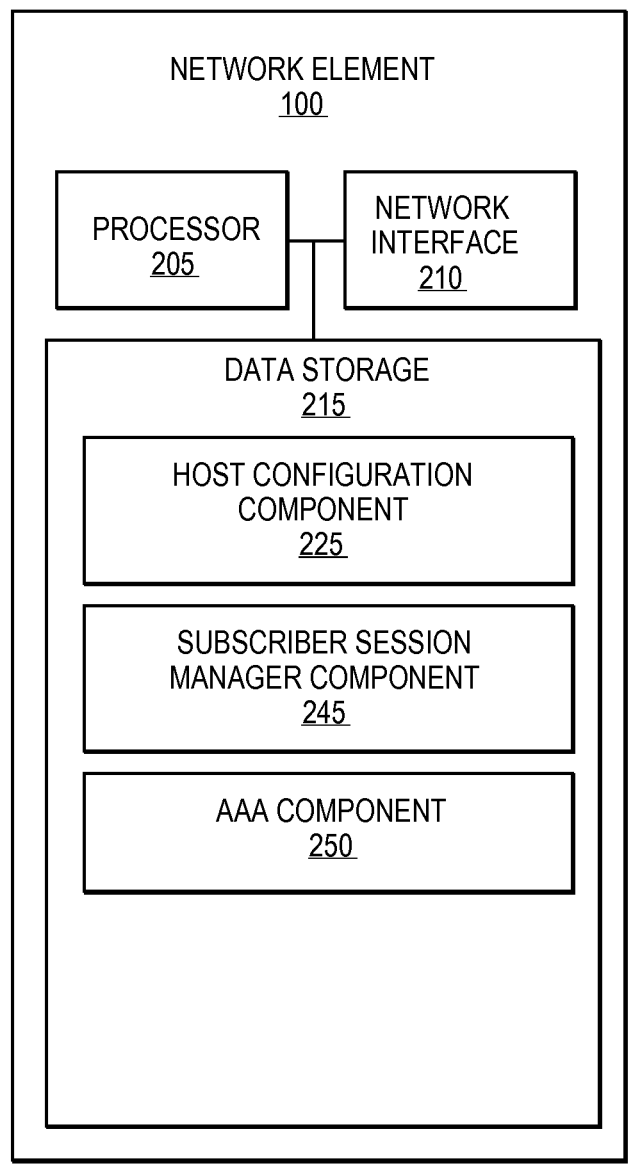
FIG. 2A is a diagram of one embodiment of a network element that enables a subscriber to access a plurality of network services over non-channelized media using a single dual-stack session.

FIG. 2A is a diagram of one embodiment of a network element 100 that enables a subscriber to access a plurality of network services over non-channelized media using a single dual-stack session. The network element 100 is provided by way of example, rather than limitation. One skilled in the art would understand that other network elements with differing configuration can implement the process described herein.

The network element 100 can include one or more processors 205, network interfaces 210, and data storage 215 that contains functional components. In one embodiment, the network element 100 can be implemented as a server or set of servers executing each of the components stored in a data storage 215 therein including a host configuration component 225, subscriber session manager component 245, and AAA component 250. Those skilled in the art will understand that the components are an example organization of the network element 100 and are provided by way of example and not limitation and that other organizations of the functions and components are possible and they could be distributed over any number of individual servers, processors or similar hardware components. The network element 100 can incorporate any number of processors 205 or processing devices that are within a single server or a set of servers that implement the network element 100. These processors 205 execute the components of the network element 100, which can be stored in a data storage 215 and executed by the processors 205 in combination with working memory and similar resources within the network element 100. One or more network interfaces 210 allow the network element 100 to interface with the residential gateway 120, computing device 140, database server 130, and other devices communicatively coupled to the network element 100. In one embodiment, the network element 100 is a broadband network gateway (BNG) such as the Smart Services Router (SSR) available from Telefonaktiebolaget L. M. Ericsson of Stockholm, Sweden.

The host configuration component 225 is capable of configuring and enabling a host (e.g., residential gateway 120 or computing device 140) to access a network service. In one embodiment, the host configuration component 225 can receive a request from a host for a network service. In some embodiments, the request includes a MAC address of the host. The host configuration component 225 can respond to this request by enabling the host to access the network service. In one embodiment the host configuration protocol enables the host to access the network service by providing the host with a network address that the host can use to access the network service. As will be described in more detail below, in one embodiment, the host configuration component 225 is a DHCP component 220 and/or a DHCPv6 230 component for configuring a host based on DHCP. In one embodiment, the host configuration component 225 includes a NDP component 260 to perform neighbor discovery for IP and stateless address auto-configuration.

The subscriber session manager component 245 is capable of creating and managing subscriber sessions. In one embodiment, the subscriber session manager component 245 maintains information about subscribers and subscriber sessions. For example, the subscriber session manager component 245 may keep track of the MAC address of the subscriber for each subscriber session. In one embodiment, the subscriber session manager component 245 can determine whether the MAC address of a host requesting a network service matches a MAC address of an existing subscriber session for a previously configured network service. If the MAC address of the requesting host matches a MAC address of an existing subscriber session, the subscriber session manager component 245 can consolidate a subscriber session for the requested network service and the previously configured network service into a single dual-stack session. The requested network service and the previously configured network service can then be managed by the single dual-stack session. As will be described in more detail below, in one embodiment, the subscriber session manager component 245 is a CLIPS component 240 for creating and managing a CLIPS subscriber session.

In one embodiment, the subscriber session manager component 245 can interact with the AAA component 250 (described below) to obtain a user record of a subscriber that contains various attributes pertaining to the subscriber and the subscriber's session. In one embodiment, the subscriber session manager component 245 can determine from the user record whether the host supports both a first network service and a second network service. If the host supports both the first network service and the second network service, the subscriber session manager component 245 can create a single dual-stack session that combines the first network service and the second network service. The first network service and the second network service can then be managed by the single dual-stack session.

The AAA component 250 performs authentication, authorization, and accounting for subscribers. The AAA component 250 typically interacts with the database server 130 to control access to network resources. In one embodiment, the AAA component 250 can make an authentication request to a database server 130 to authenticate the subscriber and to obtain data about the subscriber's session. The AAA component 250 can also receive an authentication response from the database server 130. In one embodiment, the authentication response from the database server 130 includes a user record. The user record may contain information about the subscriber and attributes for the subscriber's session such as whether the subscriber supports a particular network service. In one embodiment, the AAA component 250 can inspect various attributes of the subscriber's user record to determine whether the subscriber supports one or more network services.

A more specific embodiment of the systems, components, and processes described above will now be described to illustrate the present invention. For simplicity and clarity of illustration, the following example illustrates operations for enabling IPv4 and IPv6 network service using CLIPS on a single dual-stack session. However, one of ordinary skill in the art will understand that the present invention can be modified to enable other types of network services and any number of network services using a single session without departing from the spirit and scope of the present invention.

Figure 2B:
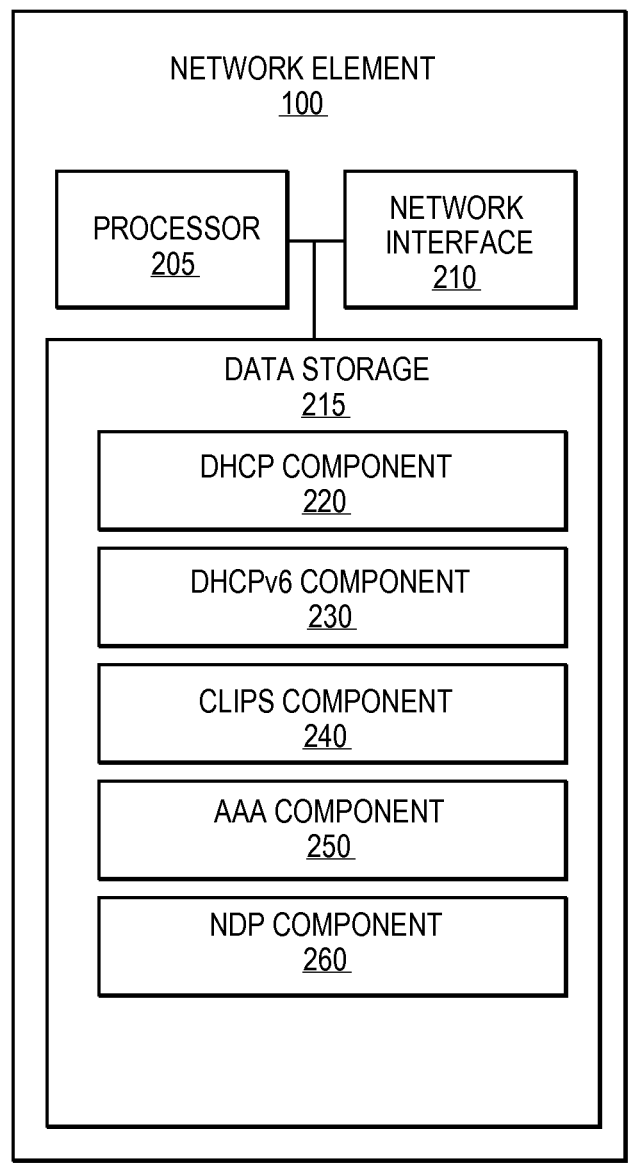
FIG. 2B is a diagram of one embodiment of a network element that enables a subscriber to access IPv4 network services and IPv6 network services over non-channelized media using a single CLIPS dual-stack session.

FIG. 2B is a diagram of one embodiment of a network element 100 that enables a subscriber to access IPv4 network services and IPv6 network services over non-channelized media using a single CLIPS dual-stack session. The network element 100 is provided by way of example, rather than limitation. One skilled in the art would understand that other network elements with differing configuration can implement the process described herein.

The network element 100 can include one or more processors 205, network interfaces 210, and data storage 215 that contains functional components. In one embodiment, the network element 100 can be implemented as a server or set of servers executing each of the components stored in a data storage 215 therein including a DHCP component 220, DHCPv6 component 230, CLIPS component 240, AAA component 250, and NDP component 260. Those skilled in the art will understand that the components are an example organization of the network element 100 and are provided by way of example and not limitation and that other organizations of the functions and components are possible and they could be distributed over any number of individual servers, processors or similar hardware components. The network element 100 can incorporate any number of processors 205 or processing devices that are within a single server or a set of servers that implement the network element 100. These processors 205 execute the components of the network element 100, which can be stored in a data storage 215 and executed by the processors 205 in combination with working memory and similar resources within the network element 100. One or more network interfaces 210 allow the network element 100 to interface with the residential gateway 120, computing device 140, database server 130, and other devices communicatively coupled to the network element 100. In one embodiment, the network element 100 is a broadband network gateway (BNG) such as the Smart Services Router (SSR) available from Telefonaktiebolaget L. M. Ericsson of Stockholm, Sweden.

The DHCP component 220 is capable of dynamically assigning an IPv4 address to a host so that the host can access an IPv4 network service. The DHCP component 220 can receive a request from a host for an IPv4 network address. In one embodiment, the request for an IPv4 network address is a DHCP discover packet. The DHCP component 220 can respond to this request by providing an IPv4 network address from a pool of available addresses.

The DHCPv6 component 230 is capable of dynamically assigning an IPv6 address to a host so that the host can access an IPv6 network service. The DHCPv6 component 230 can receive a request from a host for an IPv6 network address. In one embodiment, the request for an IPv6 network address is a DHCP solicit packet. The DHCPv6 component 230 can respond to this request by providing an IPv6 network address from a pool of available addresses. In one embodiment, the DHCPv6 component 230 is also capable of IPv6 prefix delegation. For example, the DHCPv6 component 230 can assign an IPv6 prefix to a home router 120. The home router 120, in turn, can delegate IPv6 addresses from the IPv6 prefix to the computing devices 140 at the home 150.

The CLIPS component 240 is capable of creating and managing a CLIPS subscriber session. CLIPS allows for individualized treatment of subscribers over non-channelized media. In one embodiment, CLIPS identifies subscribers based on an identification of the computing device 140 or router 120, such as the MAC address of the networking card within the computing device 140 or router 120. The CLIPS component 240 can create and activate new CLIPS sessions for a subscriber. The CLIPS component 240 can also delete a subscriber's CLIPS session. In one embodiment, the CLIPS component 240 includes a table data structure to store CLIPS sessions for one or more subscribers. The CLIPS sessions can include subscriber information such as the MAC address of the subscriber and various attributes pertaining to the subscriber's session such as access control lists, quality of service (QoS), and other attributes for individualized treatment of the subscriber's session. In one embodiment, the CLIPS component 240 can consolidate multiple CLIPS sessions into a single CLIPS session. In one embodiment, the CLIPS component 240 can interact with the AAA component 250 (described below) to obtain various attributes pertaining to the subscriber and the subscriber's session.

The AAA component 250 performs authentication, authorization, and accounting for subscribers. The AAA component 250 typically interacts with the database server 130 to control access to network resources. In one embodiment, the AAA component 250 can make an authentication request to a database server 130 to authenticate the subscriber and to obtain data about the subscriber's session. The AAA component 250 can also receive an authentication response from the database server 130. In one embodiment, the authentication response from the database server 130 includes a user record. The user record may contain information about the subscriber and attributes for the subscriber's session such as whether the subscriber supports IPv4 and IPv6 network services.

The NDP component 260 is capable of providing an IPv6 addresses for a host. In one embodiment, NDP component 260 performs neighbor discovery for IP and stateless address auto-configuration. In one embodiment, the NDP component 260 can send a router advertisement to a computing device 140 that includes the computing device's 140 assigned IPv6 address.

Figure 5:
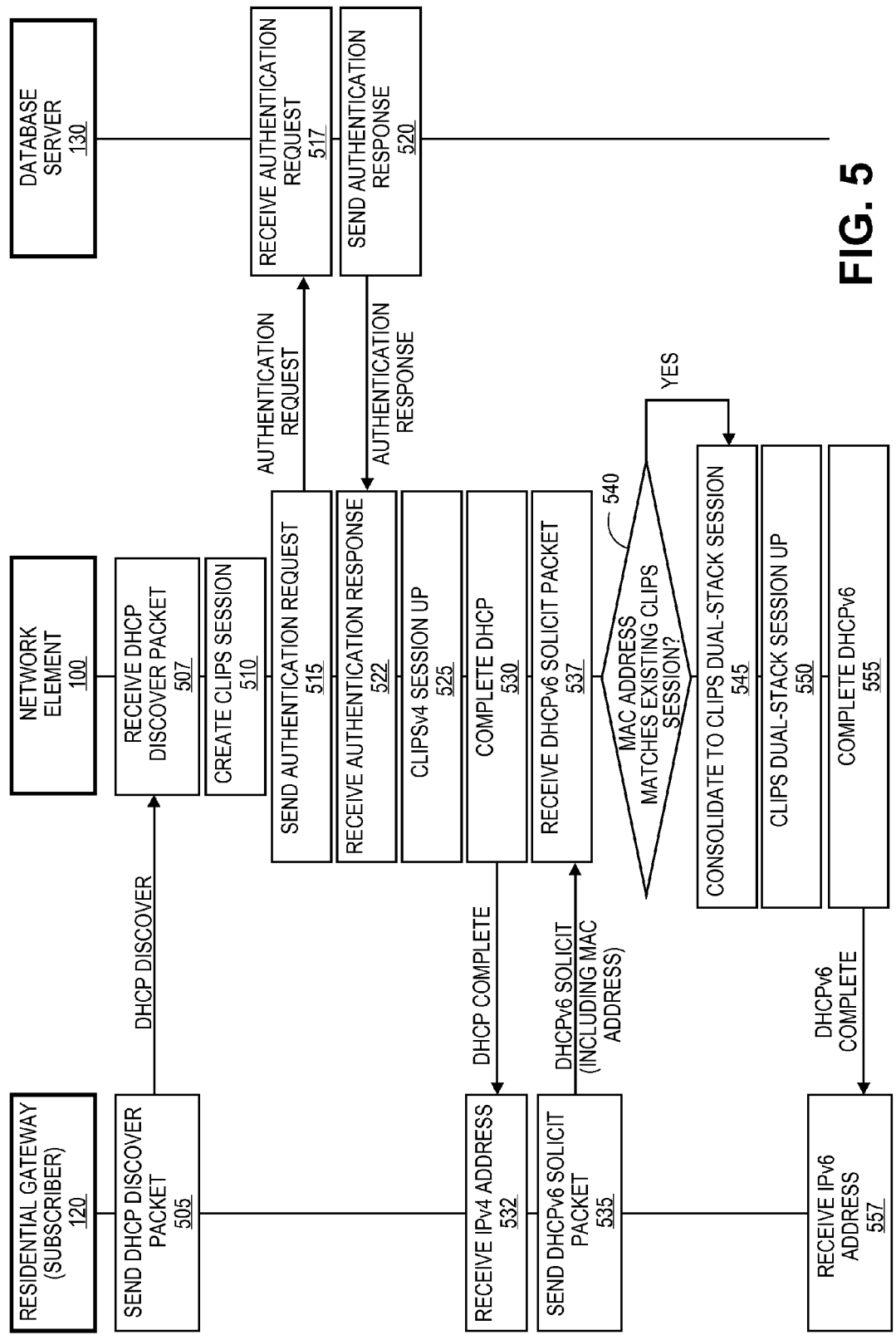
FIG. 5 is a flow diagram of one embodiment of a set of operations for enabling a residential gateway to access IPv4 and IPv6 network services over non-channelized media using CLIPS on a single dual-stack session.

FIG. 5 is a flow diagram of one embodiment of a set of operations for enabling a residential gateway 120 to access IPv4 and IPv6 network services over non-channelized media using CLIPS on a single dual-stack session. The operations of the flow diagram will be described with references to the system 160 shown in FIG. 1 and the network element 100 shown in FIG. 2B. The operations of the flow diagram may be performed by various components of the network element 100, which may be implemented as processing logic in software, hardware, or a combination thereof. However, it should be understood that the operations of the flow diagram could be performed by embodiments of systems and network elements other than those discussed with reference to the block diagrams, and embodiments discussed with reference to the system 160 and network element 100 could perform operations different than those discussed with reference to the flow diagram.

In block 505, the residential gateway 120 sends a DHCP discover packet to the DHCP component 220 to request an IPv4 address. The residential gateway 120 can be considered as the CLIPS subscriber. In one embodiment, the DHCP discover packet includes the MAC address of the residential gateway 120. In block 507, the DHCP component 220 receives the DHCP discover packet and the CLIPS component 240 creates a CLIPS session for the subscriber at block 510. At block 515, the AAA component 250 sends an authentication request to a database server 130 to authenticate the subscriber. At block 517, the database server 130 receives the authentication request and at block 520, the database server 130 sends an authentication response back to the AAA component 250. In one embodiment, if the subscriber is successfully authenticated and authorized, the authentication response may include a user record including various attributes for the subscriber and the subscriber's CLIPS session. At block 522, the AAA component 250 receives the authentication response. If the subscriber is successfully authenticated and authorized, at block 525, the CLIPS component 240 activates the CLIPS session and a CLIPSv4 session is up. In block 530, the DHCP 220 component completes the DHCP process by sending the subscriber an IPv4 address. At block 532, the subscriber receives the IPv4 address. The subscriber can use this IPv4 address to access the IPv4 network service. The subscriber can now access the IPv4 network service and the subscriber's IPv4 network service is managed by the CLIPSv4 session.

In block 535, the residential gateway 120 sends a DHCPv6 solicit packet to the DHCPv6 component 230. In one embodiment, the packet header (e.g., Ethernet header) of the DHCPv6 solicit packet includes the MAC address of the residential gateway 120. At block 537, the DHCPv6 component 230 receives the DHCPv6 solicit packet. In block 540, The CLIPS component 240 then checks whether the MAC address of the residential gateway 120 matches the MAC address of an existing CLIPS session. In this example, a CLIPSv4 session for the residential gateway 120 has already been established as described above. Thus, the CLIPS component 240 will determine that the MAC address of the residential gateway 120 matches the MAC address of the existing CLIPSv4 session. In response to determining that the MAC address of the residential gateway 120 matches the MAC address of the existing CLIPSv4 session, at block 545, the CLIPS component 240 consolidates a CLIPSv6 session for the IPv6 network service with the existing CLIPSv4 session to create a CLIPS dual-stack session. In block 550, the CLIPS component 240 activates the CLIPS dual-stack session and the CLIPS dual-stack session is up. In block 555, the DHCPv6 component 230 completes the DHCPv6 process by sending the subscriber an IPv6 address. At block 557, the subscriber receives the IPv6 address. The subscriber can use this IPv6 address to access the IPv6 network service. The subscriber can now access both IPv4 and IPv6 network services and both network services are managed by the single CLIPS dual-stack session.

An advantage of having a single dual-stack session (as opposed to two separate sessions) is that system resources are saved. Some network services limit the number of sessions that can be active at a given time. By consolidating sessions, more subscribers can be supported. Furthermore, common services such as Access Control List (ACL) and Quality of Service (QoS) can be easily applied to a single stack or both stacks of a dual-stack session. For example, for a dual-stack session that has an IPv4 stack and an IPv6 stack, the same or different QoS can be applied to the IPv4 traffic and IPv6 traffic. Another advantage of having a single dual-stack session is that accounting can be consolidated. For example, with dual-stack sessions, operators can easily track usage statistics for IPv4 traffic and IPv6 traffic for a single subscriber separately as well as aggregately.

Bridged Residential Gateway Configuration

Figure 6:
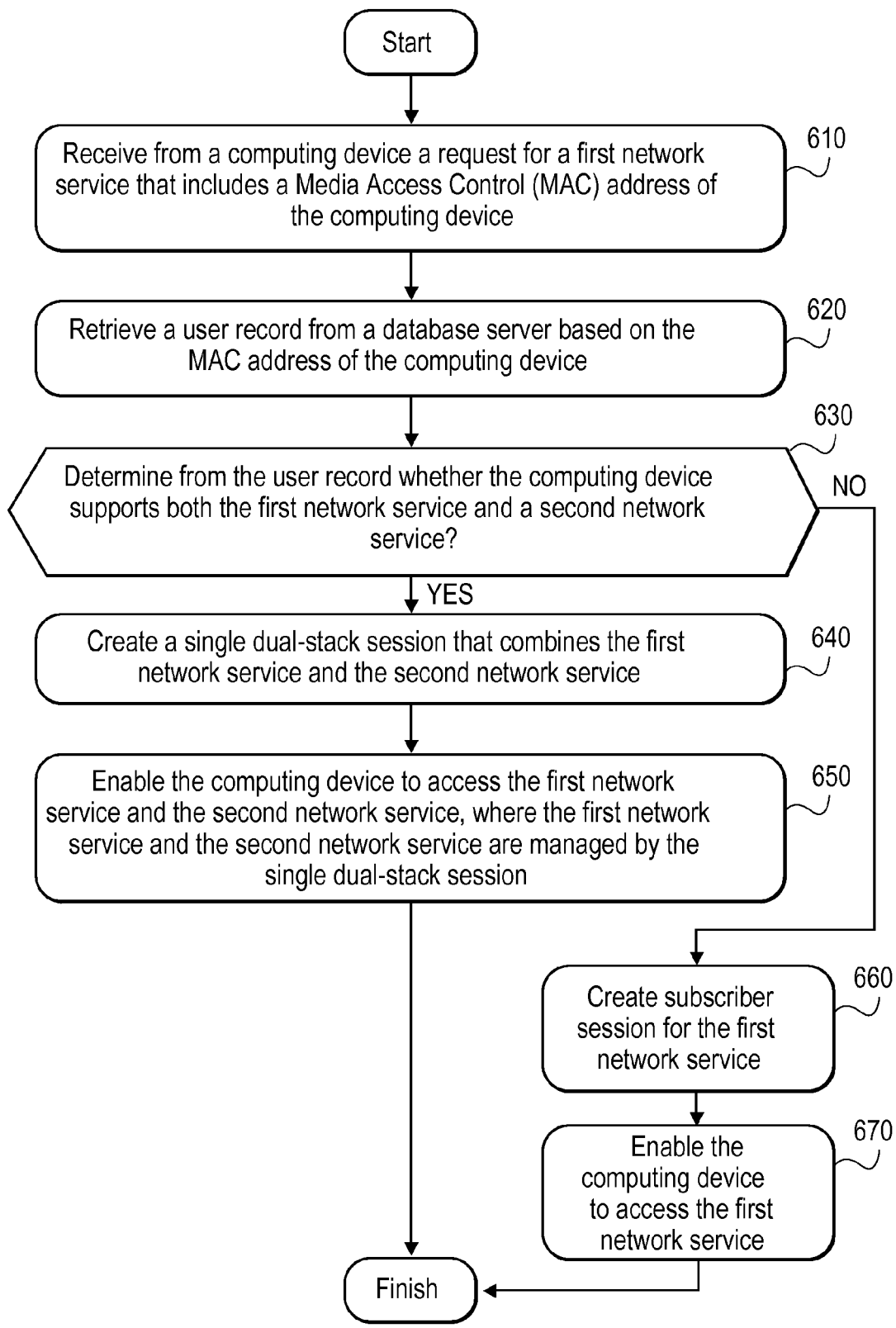
FIG. 6 is a flow diagram of one embodiment of a set of operations for enabling a plurality of network services for a subscriber over non-channelized media using a single dual-stack session for a bridged residential gateway configuration.

FIG. 6 is a flow diagram of one embodiment of a set of operations for enabling a plurality of network services for a subscriber over non-channelized media using a single dual-stack session for a bridged residential gateway 120 configuration. The operations of the flow diagram will be described with references to the system 160 shown in FIG. 1. The operations of the flow diagram may be performed by various components of the network element 100, which may be implemented as processing logic in software, hardware, or a combination thereof. For example, the operations of the flow diagram may be performed by the various components of the network element shown in FIG. 2A. However, it should be understood that the operations of the flow diagram could be performed by embodiments of systems and network elements other than those discussed with reference to the block diagrams, and embodiments discussed with reference to the system 160 and network element 100 could perform operations different than those discussed with reference to the flow diagram.

In block 610, a network element 100 receives a request from a computing device 140 for a first network service that includes a media access control (MAC) address of the computing device 140. In one embodiment, the request is based on Dynamic Host Configuration Protocol (DHCP), which allows for the assignment of Internet Protocol (IP) addresses to computing devices 140 being coupled to a network 110, as is known in the art. In one such embodiment, the request from the computing device 140 is a DHCP discover packet, which is requesting an Internet Protocol version 4 (IPv4) address from the network element 100. The DHCP discover packet, in certain embodiments, includes a Media Access Control (MAC) address of a customer premise equipment (such as the network card) within the computing device 140 that is communicating with the network element 100. Returning to FIG. 1 to help illustrate, the request for network service message is transmitted by the computing device 140, which can be considered as a subscriber of the network service.

In block 620, the network element 100 retrieves a user record from a database server 130 based on the MAC address of the computing device 140. The user record, in certain embodiments, includes various attributes pertaining to the subscriber (i.e., the computing device 140). In one embodiment, the user record includes an attribute that indicates whether the computing device 140 supports IPv4 network services and/or IPv6 network services. For example, a user record that has a DHCP-max-address attribute and framed-ipv6-prefix attribute or framed-ipv6-pool attribute configured for the subscriber indicates that the subscriber supports IPv4 and IPv6 network services.

In decision block 630, the network element 100 determines from the user record whether the computing device 140 supports both the first network service and a second network service. In one embodiment, the first network service is an IPv4 network service and the second network service is an IPv6 network service. In such an embodiment, the network element 100 can inspect various attributes of the user record to determine whether the computing device 140 supports both IPv4 and IPv6 network services. For example, as discussed above, the network element 100 can inspect the DHCP-max-address attribute, framed-ipv6-prefix attribute, or framed-ipv6-pool attribute of the user record to make this determination.

If the network element 100 determines that the computing device 140 does not support the second network service, at block 660, the network element 100 creates a subscriber session for the first network service according to legacy operation. Then, at block 360, the network element enables the computing device 140 to access the first network service.

If the network element determines that the computing device 140 supports the first network service and the second network service, at block 640, the network element 100 creates a single dual-stack session that combines the first network service and the second network service. In one embodiment, the dual-stack session includes a CLIPS IPv4 stack and a CLIPS IPv6 stack. Further, one having ordinary skill in the art will understand that other types of network services and any number of network services can be combined into a single session.

In block 650, the network element 100 enables the computing device 140 to access the first network service and the second network service where the first network service and the second network service are managed by the single dual-stack session. In an embodiment where the request for the first network service is a request for IPv4 network services based on the DHCP protocol, the network element 100 enables the computing device 140 to access the IPv4 network service by transmitting a DHCP offer message to the computing device 140. The DHCP offer message provides the computing device 140 with an IPv4 address it can use to access the IPv4 network service. In one embodiment, the network element 100 also enables the computing device 140 to access the IPv6 network service by providing the computing device 140 with an IPv6 address it can use to access the IPv6 network service. In one embodiment, the IPv6 address can be transmitted to the computing device 140 via Neighbor Discovery Protocol (NDP). For example, the network element 100 may send a message containing the IPv6 address assigned to the computing device 140 in a multicast broadcast over an Ethernet cable. The MAC address of the computing device 140 can be embedded in the multicast message to identify the computing device 140 as the recipient. As a result, the computing device 140 can access two network services (e.g., IPv4 and IPv6 network services) that are managed by a single dual-stack CLIPS session.

Figure 7:
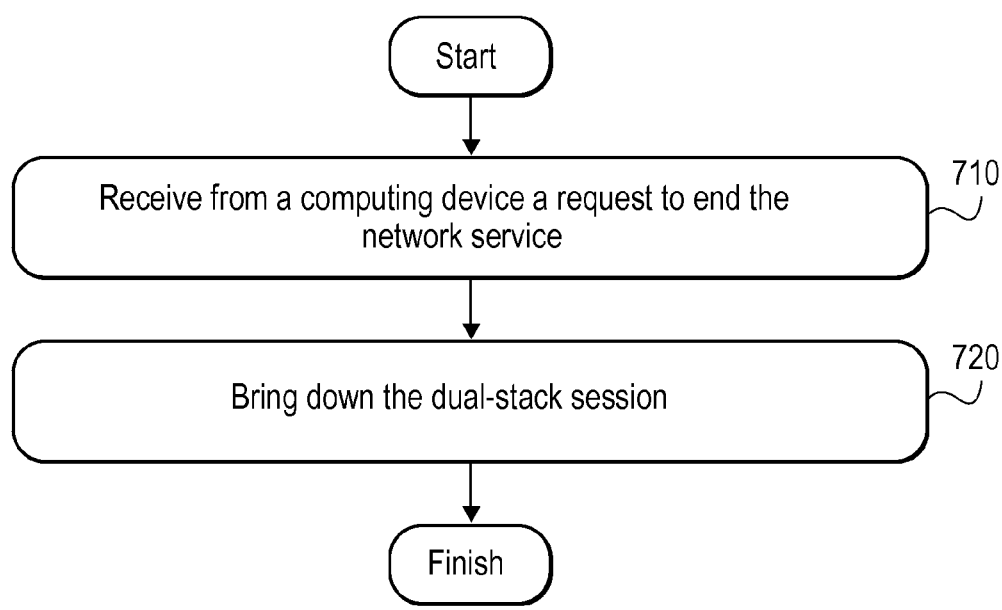
FIG. 7 is a flow diagram of one embodiment of a set of operations for bringing down a dual-stack session for a bridged residential gateway configuration.

FIG. 7 is a flow diagram of one embodiment of a set of operations for bringing down a dual-stack session for a bridged residential gateway 120 configuration. The operations of the flow diagram will be described with references to the system 160 shown in FIG. 1. The operations of the flow diagram may be performed by various components of the network element 100, which may be implemented as processing logic in software, hardware, or a combination thereof. However, it should be understood that the operations of the flow diagram could be performed by embodiments of systems and network elements other than those discussed with reference to the block diagrams, and embodiments discussed with reference to the system 160 and network element 100 could perform operations different than those discussed with reference to the flow diagram.

In block 710, a request to end the network service from the computing device 140 is received. In one embodiment, the request is a DHCP release packet. In block 720, the network element 100 brings down the dual-stack session. In one embodiment, bringing down the dual-stack session involves deleting a CLIPS session. After the dual-stack session is brought down, the subscriber can no longer access the first network service or the second network service and the session down operation is complete.

A more specific embodiment of the systems, components, and processes described above will now be described to illustrate the present invention. For simplicity and clarity of illustration, the following example illustrates operations for enabling IPv4 and IPv6 network service using CLIPS on a single dual-stack session. However, one of ordinary skill in the art will understand that the present invention can be modified to enable other types of network services any number of network services using a single session without departing from the spirit and scope of the present invention.

Figure 8:
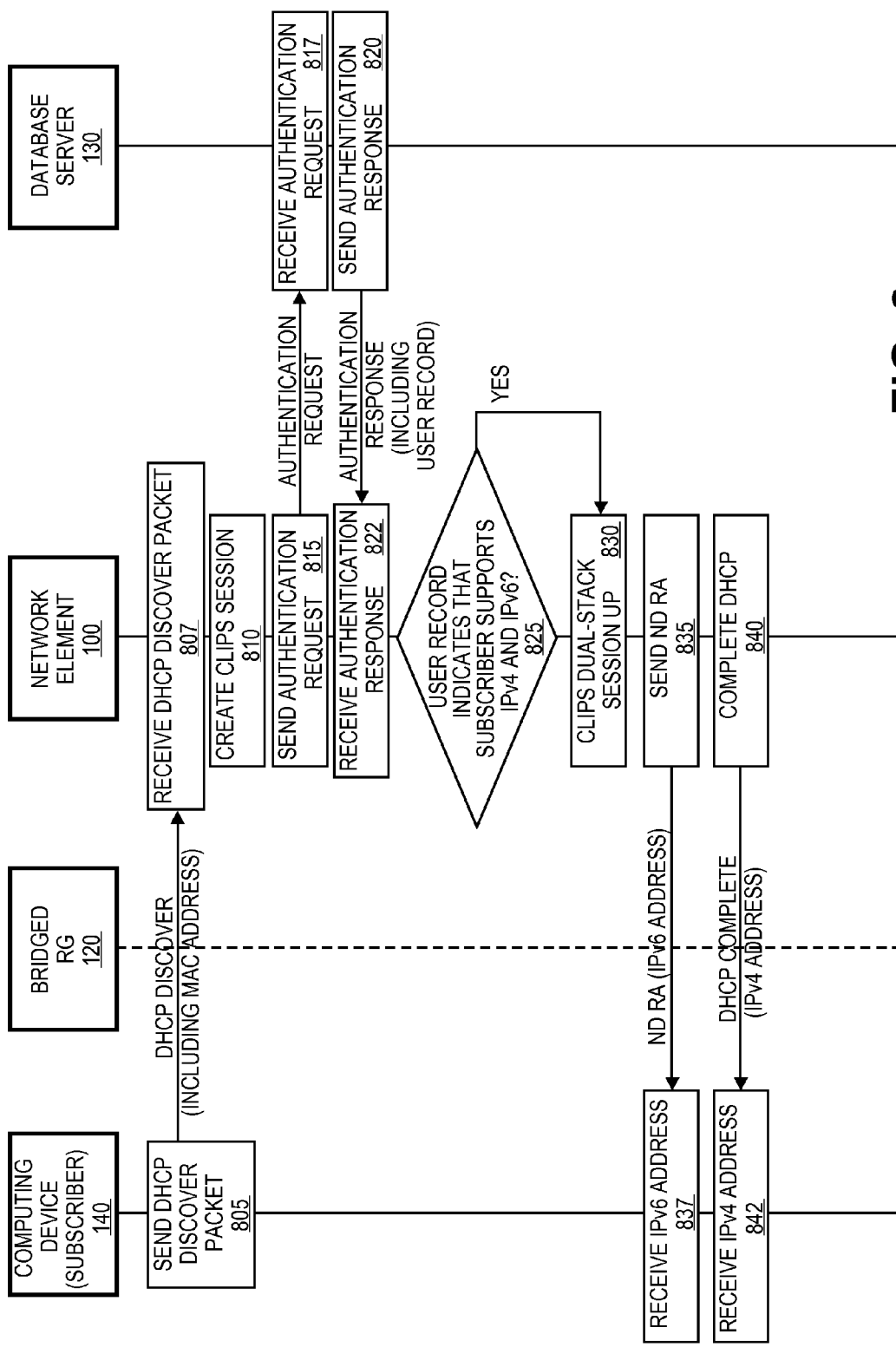
FIG. 8 is a flow diagram of one embodiment of a set of operations for enabling a computing device to access IPv4 and IPv6 network services over non-channelized media using CLIPS on a single dual-stack session.

FIG. 8 is a flow diagram of one embodiment of a set of operations for enabling a computing device 140 to access IPv4 and IPv6 network services over non-channelized media using CLIPS on a single dual-stack session. The operations of the flow diagram will be described with references to the system 160 shown in FIG. 1 and the network element 100 shown in FIG. 2B. The operations of the flow diagram may be performed by various components of the network element 100, which may be implemented as processing logic in software, hardware, or a combination thereof. However, it should be understood that the operations of the flow diagram could be performed by embodiments of systems and network elements other than those discussed with reference to the block diagrams, and embodiments discussed with reference to the system 160 and network element 100 could perform operations different than those discussed with reference to the flow diagram.

In block 805, the computing device 140 sends a DHCP discover packet to the DHCP component 220 to request an IPv4 address. The computing device 140 can be considered as the CLIPS subscriber. In one embodiment, the DHCP discover packet includes the MAC address of the computing device 140. At block 807, the DHCP component 220 receives the DHCP discover packet and the CLIPS component 240 creates a CLIPS session for the subscriber at block 810. At block 815, the AAA component 250 sends an authentication request to a database server 130 to authenticate the subscriber. At block 817, the database server 130 receives the authentication request and at block 820, the database server 130 sends an authentication response back to the AAA component 250. In one embodiment, if the subscriber is successfully authenticated and authorized, the authentication response may include a user record including various attributes for the subscriber and the subscriber's CLIPS session. At block 822, the AAA component 250 receives the authentication response. In block 825, the AAA component 250 checks whether the subscriber supports both IPv4 and IPv6 network services by inspecting the user record from the database server 130. In one embodiment, the AAA component 250 determines that the subscriber supports both IPv4 and IPv6 network services by checking whether the framed-ipv6-prefix attribute or the framed-ipv6-pool attribute is configured for the subscriber. If the AAA component 250 determines that the subscriber supports both IPv4 and IPv6 network services, at block 830, the CLIPS component 240 creates and activates a CLIPS dual-stack session that can manage both the IPv4 network service and the IPv6 network service. In block 835, the NDP component 260 sends a NDP Router Advertisement (RA) including an IPv6 address assigned to the subscriber. At block 837, the subscriber receives the IPv6 address. The subscriber can use this IPv6 address to access the IPv6 network service. In block 840, the DHCP component 220 completes the DHCP process by sending the subscriber an IPv4 address. At block 842, the subscriber receives the IPv4 address. The subscriber can use this IPv4 address to access the IPv4 network service. Thus, the subscriber can now access IPv4 and IPv6 network services and both network services are managed by the single CLIPS dual-stack session.

An advantage of having a single dual-stack session (as opposed to two separate sessions) is that system resources are saved. Some network services limit the number of sessions that can be active at a given time. By consolidating sessions, more subscribers can be supported. Furthermore, common services such as Access Control List (ACL) and Quality of Service (QoS) can be easily applied to a single stack or both stacks of a dual-stack session. For example, for a dual-stack session that has an IPv4 stack and an IPv6 stack, the same or different QoS can be applied to the IPv4 traffic and IPv6 traffic. Another advantage of having a single dual-stack session is that accounting can be consolidated. For example, with dual-stack sessions, operators can easily track the usage statistics for IPv4 traffic and IPv6 traffic for a single subscriber separately as well as aggregately.

Figure 9:
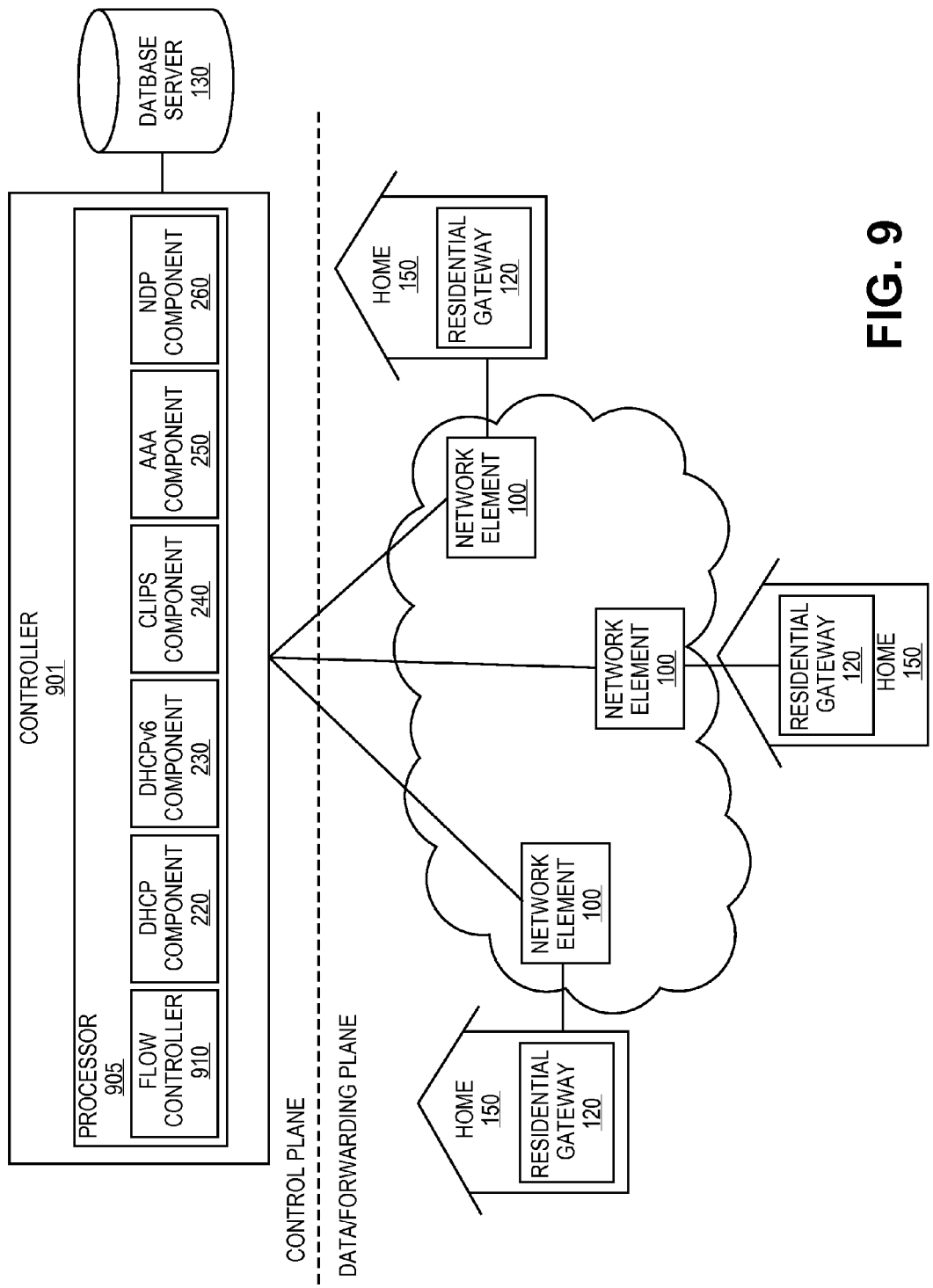
FIG. 9 is a diagram of one embodiment of a split-architecture implementation for enabling a plurality of network services for a subscriber over non-channelized media using a single dual-stack session.

FIG. 9 is a diagram of one embodiment of a split-architecture implementation for enabling a plurality of network services for a subscriber over non-channelized media using a single dual-stack session. In one embodiment, the process is implemented by a controller 901 in a split-architecture, rather than at the network element 100. The controller 901 manages the control plane functionality of the network, while the network elements 100 implement the data/forwarding plane aspects of the network. Thus, the control plane functions have been removed from the network element 100 to the remote controller 901 that can be at any location relative to the network in which the network elements 100 are situated such that the controller is in communication with each of the network elements 100.

The controller 901 can include a processor 905 to execute the DHCP component 220, DHCPv6 component 230, CLIPS component 240, AAA component 250, and NDP component 260. These functions can be implemented by a single processor 905 or a set of processors distributed over any number of devices implementing the controller 901. For sake of clarity, an example with a single device and processor 905 is described. The AAA component 250 can access the data base server 130 that can be maintained locally or at a location in communication with the controller 901.

A flow controller 910 can implement any flow control protocol to enable the controller to communicate and configure the network elements 100 in the network, including configuring network elements 100 to establish and manage a dual-stack CLIPS session for a subscriber such as a residential gateway 120 and/or a computing device 140 (not shown) connected to the residential gateway 120. In one example embodiment, the flow controller 910 can communicate and configure the flow control elements of the network elements 100 using the OpenFlow protocol. One skilled in the art would understand that any similar flow control protocol can be utilized that enables the controller to configure the network elements and control the data plane of the network.

Thus, a method and apparatus for enabling a plurality of network services for a subscriber over non-channelized media using a single dual-stack session have been described. Although the present invention has been described with reference to specific exemplary embodiments, it will be evident that various modifications and changes may be made to these embodiments without departing from the broader spirit and scope of the invention. For example, while embodiments of the invention are described such that a separate database server 130 is coupled to store data related to subscriber sessions, in other embodiments, such data can be stored within the network element 100. Accordingly, the specification and drawings are to be regarded in an illustrative rather than a restrictive sense.

What is claimed is:

1. A method implemented by a network element to support a plurality of network services between a computing device and the network element over non-channelized media using a single subscriber session, the method comprising the steps of:

receiving from the computing device a request for a first network service, the request including a Media Access Control (MAC) address of the computing device;

retrieving a user record from a database server based on the MAC address of the computing device;

determining from the user record whether the computing device supports both the first network service and a second network service;

creating a single dual-stack session that is configured to manage the first network service and the second network service upon determining from the user record that the computing device supports the first network service and the second network service, wherein the single dual-stack session is a Clientless Internet Protocol Services (CLIPS) dual-stack session that includes a CLIPS IPv4 (CLIPSv4) stack for managing an Internet Protocol Version 4 (IPv4) network service and a CLIPS IPv6 (CLIPSv6) stack for managing an Internet Protocol Version 6 (IPv6) network service;

enabling the computing device to access the first network service and the second network service, wherein the first network service and the second network service are managed by the single dual-stack session; and bringing down the CLIPSv4 stack and the CLIPSv6 stack of the single dual-stack session in response to receiving, from the computing device, a request to end the first network service.

2. The method of claim 1, further comprising the step of:
tracking usage statistics for network traffic associated with the first network service and network traffic associated with the second network service separately and aggregately.

3. The method of claim 1, further comprising the step of:
applying a different network traffic policy to network traffic associated with the first network service and network traffic associated with the second network service.

4. The method of claim 3, wherein the network traffic policy is a setting for Quality of Service (QoS).

5. The method of claim 1, wherein the first network service is the IPv4 network service and the second network service is the IPv6 network service.

6. The method of claim 5, wherein determining from the user record whether the computing device supports both the first network service and the second network service comprises the step of:
inspecting a framed-ipv6-prefix attribute or framed-ipv6-pool attribute of the user record.

7. The method of claim 1, wherein enabling the computing device to access the first network service and the second network service further comprises the step of:
transmitting to the computing device a Dynamic Host Configuration Protocol (DHCP) offer message, the DHCP offer message including an IPv4 address assigned to the computing device.

8. The method of claim 1, wherein enabling the computing device to access the first network service and the second network service further comprises the step of:
transmitting to the computing device via Neighbor Discovery Protocol (NDP) an IPv6 address assigned to the computing device.

9. A network element apparatus configured to support a plurality of network services between a computing device and the network element apparatus over non-channelized media using a single subscriber session, the network element apparatus comprising:
a network interface to communicate with the computing device; and
a processor communicatively coupled to the network interface, the processor configured to execute a host configuration component, an Authentication, Authorization, and Accounting (AAA) component, and a subscriber session manager component, the host configuration component configured to receive from the computing device a request for a first network service, where the request includes a Media Access Control (MAC) address of the computing device, the AAA component configured to retrieve a user record from a database server based on the MAC address of the computing device and to determine from the user record whether the computing device supports both the first network service and a second network service, the subscriber session manager component configured to create a single dual-stack session that is configured to manage the first network service and the second network service upon determining from the user record that the computing device supports the first network service and the second network service, wherein the single dual-stack session is a Clientless Internet Protocol Services (CLIPS) dual-stack session that includes a CLIPS IPv4 (CLIPSv4) stack for managing an Internet Protocol Version 4 (IPv4) network service and a CLIPS IPv6 (CLIPSv6) stack for managing an Internet Protocol Version 6 (IPv6) network service, the host configuration component further configured to enable the computing device to access the first network service and the second network service, where the first network service and the second network service are managed by the single dual-stack session, the subscriber session manager component further configured to bring down the CLIPSv4 stack and the CLIPSv6 stack of the single dual-stack session in response to receiving, from the computing device, a request to end the first network service.

10. The network element apparatus of claim 9, wherein the single dual-stack session tracks usage statistics for network traffic associated with the first network service and network traffic associated with the second network service separately and aggregately.

11. A non-transitory computer-readable storage medium, having stored therein a computer program, which when executed by a computer, cause the computer to perform a set of operations comprising:
receiving from a computing device a request for a first network service, the request including a Media Access Control (MAC) address of the computing device;
retrieving a user record from a database server based on the MAC address of the computing device;
determining from the user record whether the computing device supports both the first network service and a second network service;
creating a single dual-stack session that is configured to manage the first network service and the second network service upon determining from the user record that the computing device supports the first network service and the second network service, wherein the single dual-stack session is a Clientless Internet Protocol Services (CLIPS) dual-stack session that includes a CLIPS IPv4 (CLIPSv4) stack for managing an Internet Protocol Version 4 (IPv4) network service and a CLIPS IPv6 (CLIPSv6) stack for managing an Internet Protocol Version 6 (IPv6) network service;
enabling the computing device to access the first network service and the second network service, wherein the first network service and the second network service are managed by the single dual-stack session; and
bringing down the CLIPSv4 stack and the CLIPSv6 stack of the single dual-stack session in response to receiving, from the computing device, a request to end the first network service.

12. The non-transitory computer-readable storage medium of claim 11, wherein the computer program, when executed by the computer, cause the computer to perform a further set of operations comprising:
tracking usage statistics for network traffic associated with the first network service and network traffic associated with the second network service separately and aggregately.

13. The non-transitory computer-readable storage medium of claim 11, wherein the computer program, when executed by the computer, cause the computer to perform a further set of operations comprising:
applying a different network traffic policy to network traffic associated with the first network service and network traffic associated with the second network service.

14. The non-transitory computer-readable storage medium of claim 13, wherein the network traffic policy is a setting for Quality of Service (QoS).

15. The non-transitory computer-readable storage medium of claim 11, wherein the first network service is the IPv4 network service and the second network service is the IPv6 network service.

16. The non-transitory computer-readable storage medium of claim 15, wherein determining from the user record whether the computing device supports both the first network service and the second network service comprises:
   inspecting a framed-ipv6-prefix attribute or framed-ipv6-pool attribute of the user record.

* * * * *